US007607910B2

(12) United States Patent
Freson et al.

(10) Patent No.: US 7,607,910 B2
(45) Date of Patent: *Oct. 27, 2009

(54) DEVICE PROVIDED WITH PIVOTABLE SUPPORTS FOR MOULDING AN OPTICAL LENS, IN PARTICULAR AN OPHTHALMIC LENS

(75) Inventors: David Freson, Estrees-Deniecourt (FR); Jean-François Cailloux, Bussy-Saint-Georges (FR)

(73) Assignee: Essilor International (Compagnie Generale d'Optique), Charenton-le-Pont (FR)

(*) Notice: Subject to any disclaimer, the term of this patent is extended or adjusted under 35 U.S.C. 154(b) by 765 days.

This patent is subject to a terminal disclaimer.

(21) Appl. No.: 10/558,399

(22) PCT Filed: Jun. 9, 2004

(86) PCT No.: PCT/FR2004/001432

§ 371 (c)(1),
(2), (4) Date: Nov. 28, 2005

(87) PCT Pub. No.: WO2004/110730

PCT Pub. Date: Dec. 23, 2004

(65) Prior Publication Data

US 2007/0013091 A1      Jan. 18, 2007

(30) Foreign Application Priority Data

Jun. 11, 2003      (FR) .................................. 03 06988

(51) Int. Cl.
*B29C 47/00*     (2006.01)
*B29D 11/00*    (2006.01)
*B22D 19/00*    (2006.01)

(52) U.S. Cl. .................. 425/192 R; 425/195; 425/808; 249/102; 264/1.32

(58) Field of Classification Search ............. 425/450.1, 425/451.4, 190, 192 R, 195, 808; 264/1.32; 249/102
See application file for complete search history.

(56) References Cited

U.S. PATENT DOCUMENTS 4,372,368 A * 2/1983 Lombard ............... 164/332
4,474,355 A * 10/1984 Greshes .................. 249/53 R (Continued)

FOREIGN PATENT DOCUMENTS

DE          24 55 888          5/1976

(Continued)

*Primary Examiner*—Joseph S. Del Sole
*Assistant Examiner*—Nahida Sultana
(74) *Attorney, Agent, or Firm*—Young & Thompson

(57) ABSTRACT

The inventive device includes a first shell holder (6) for fixing a first shell (12), a second shell holder (27) for fixing a second shell (29), a first support (1) on which the first shell holder (6) is mounted and a second support (2) on which the second shell holder (27) is mounted, the first (1) and second (2) supports being pivotable with respect to each other. When the first (1) and second (2) supports are in a first relative position thereof they are arranged oppositely to each other, thereby bringing the first (12) and second (29) shells into a predetermined relative moulding position thereof. When the first (12) and second (29) shells are brought into the second relative position thereof, the first (1) and second (2) supports are removed from each other by pivoting motion.

17 Claims, 10 Drawing Sheets

U.S. PATENT DOCUMENTS

| | | | |
|---|---|---|---|
| 5,548,352 A * | 8/1996 | Dewey | 351/160 H |
| 5,761,556 A * | 6/1998 | Ichino | 396/349 |
| 6,082,987 A * | 7/2000 | Su et al. | 425/150 |
| 6,165,392 A * | 12/2000 | Kobuchi et al. | 264/1.7 |
| 2003/0102583 A1* | 6/2003 | Hirota et al. | 264/2.7 |
| 2003/0173692 A1* | 9/2003 | Su et al. | 264/2.5 |
| 2004/0222539 A1* | 11/2004 | Hagmann et al. | 264/1.32 |
| 2005/0179148 A1* | 8/2005 | Tridon et al. | 264/1.32 |
| 2006/0267225 A1* | 11/2006 | Freson et al. | 264/1.32 |

FOREIGN PATENT DOCUMENTS

| | | |
|---|---|---|
| EP | 0 941 829 A1 * | 3/1999 |
| EP | 0 941 829 | 9/1999 |
| GB | 847 797 | 9/1960 |
| WO | WO/00/59713 * | 10/2000 |

* cited by examiner

DEVICE PROVIDED WITH PIVOTABLE SUPPORTS FOR MOULDING AN OPTICAL LENS, IN PARTICULAR AN OPHTHALMIC LENS

FIELD OF THE INVENTION

The field of the invention is that of the fabrication of optical lenses, especially ophthalmic lenses intended to form spectacle lenses.

BACKGROUND OF THE INVENTION

The invention relates more particularly to a device including molding shells for obtaining this kind of optical lens from a polymerizable material.

Molding such lenses necessitates accurate positioning of two shells relative to each other, which in prior art molding devices leads to the use of joining means between the shells. Moreover, these joining means are adapted to allow the various operations of positioning the shells, filling the resulting mold and extracting the molded lens. This is known in the art.

DESCRIPTION OF THE RELATED ART

There are known from the document U.S. Pat. No. 4,474,355 a device and a method of molding an ophthalmic lens that employs two shells and a support for the two shells that allows them to be disposed flat and at a distance from each other to form a mold.

For positioning the shells, this support includes a series of shoulders for each shell, each shoulder being formed in an upright projecting from an annular base.

The annular support provides only a shell holding function. It is necessary to manipulate the shells directly by appropriate means external to the device to bring them into a molding position and to evacuate the molded lens.

Moreover, the document DE 2 455 888 describes a device including two sets of shells, each set including a plurality of interconnected shells disposed side by side, these two sets of shells being adapted to be superposed so that the shells cooperate two by two, each facing another to form a molding cavity.

As previously, the device described necessitates direct manipulation of the shells in order to position them. Only one molding position is provided, in which the lower set of shells rests on a support on projecting feet and the upper set of shells is clipped to the lower set after the polymerizable material has been deposited in the lower shells.

SUMMARY OF THE INVENTION

The invention is directed to a molding device adapted to employ sets of removable shells and to facilitate loading and unloading the shells so that the device can be integrated into a high throughput production environment whilst remaining flexible.

To this end, the invention provides a device for producing an optical lens, especially an ophthalmic lens, from a polymerizable material, the device comprising a first molding shell, a second molding shell and means for holding said first molding shell and said second molding shell in a predetermined molding position in which they face each other at a distance in a predetermined relative position and with a predetermined orientation, characterized in that said holding means comprise:

a first shell support for immobilizing said first shell in a predetermined position relative to said first shell support and a second shell support for immobilizing said second shell in a predetermined position relative to said second shell support, and a first support on which said first shell support is mounted and a second support on which the second shell support is mounted, the first support and the second support being articulated to each other, and the first support and the second support can assume a first relative position in which they are one against the other with the first shell and the second shell in said predetermined relative position and a second relative position in which, compared to said first relative position, the first support and the second support have moved away from each other by virtue of a relative pivoting movement, said device having a molding configuration in which the first support and the second support are in said first relative position and the first shell and the second shell have said predetermined orientation.

The molding device of the invention uses shell supports and articulated supports enabling two levels of positioning the shells: firstly, the supports are positioned relative to each other; secondly, each of the shell supports is positioned relative to a respective support.

The function of the assembly formed by the supports articulated to each other is to ensure accurate positioning of the supports in their superposed position and, independently of this, the function of the shell supports is to ensure accurate positioning of each shell with respect to its respective support.

This arrangement allows ample relative movement of the two supports without adversely affecting the accuracy of the positioning of the shell supports (and thus of the shells) relative to each other since the latter assume their relative position by virtue of the accurate positioning of the supports (in their first relative position, in which they are superposed).

The movement allowed between the two supports enables the device of the invention to be modulated and to unloading of the shells and the material, as well as the molding operation as such.

Said predetermined orientation may further be a flat orientation, the device of the invention then being adapted for flat molding, where applicable with the material deposited by gravity.

Moreover, for the shell supports to be accessible independently of each other, which is advantageous, the first support and the second support may be disposed opposite each other in said second relative position.

Similarly, the device may assume an open configuration in which the first and second supports are in said second relative position and each is flat; where applicable, the respective faces of the first and second supports that face each other in said first relative position may each additionally face upward in said open configuration.

Because of these possible mutual positions of the supports, the device can be reversible, each face of each support being accessible from above, as a function of the selected mutual position.

According to one preferred feature of the invention, the device has a first configuration in which the first support and the second support are in said first relative position and each is oriented flat with the first support above the second support and a second configuration in which the first support and the second support are in said first relative position and each is oriented flat with the second support above the first support.

Over and above the individual accessibility of the shells, this makes it possible to turn the device over with the supports retained in the first relative position.

For reasons of convenience and to ensure accurate mutual positioning of the supports:

the first support and the second support may each have a reference surface, said reference surfaces being disposed against each other when the first support and the second support are against each other in said first relative position; and/or the first support and the second support are connected by a hinge.

According to one preferred feature, the device of the invention further includes two wheels perpendicular to the articulation axis of the two supports and each situated on either side of that articulation axis so that the axis of each of the wheels coincides with said articulation axis of the two supports, a first of these wheels being rotationally connected to the first support and a second of these wheels being rotationally connected to the second support so that rotation of the first wheel drives pivoting of the first support relative to the second support and rotation of the second wheel drives pivoting of the second support relative to the first support.

Moreover, said wheels may be toothed wheels each adapted to be driven by a gear connected to a motor or a rack connected to a cylinder.

The pivoting of each support being driven by wheels in this way, it is possible to automate and to sequence the mutual movements thereof necessary for a molding operation.

Moreover, to enable adjustment of the thickness to be molded, the first shell support may cooperate slidingly with the first support to enable mutual closing or opening movement of the first shell and the second shell when the first shell and the second shell are in said molding position.

Moreover, sliding of the first shell support relative to the first support may be driven by a servocontrolled cylinder which also immobilizes the first shell support relative to the first support except for closing movement of the first shell support and the second shell support.

Using a servocontrolled cylinder enables accurate adjustment of the thickness to be molded and automation of the tasks to be performed. The possibility of immobilizing the first shell support, with the exception of movement toward the second shell support, allows only movement of the two shells toward each other. This property is advantageous during the phase of polymerizing the material, to enable the first shell to track shrinkage of the material and thereby prevent the material peeling away from one of the shells.

The second shell support may also be rotatable relative to the second support.

This feature enables the use of shells for molding lenses for correcting astigmatism, which necessitate adjustment of their angular positions prior to molding.

According to a preferred feature, said predetermined position of the first shell relative to the first shell support is defined by an annular seat adapted to position the first shell in two orthogonal directions. Moreover, the first shell support may include at least one cylinder adapted to hold the first shell against said annular seat.

The annular seat and the locking cylinder guarantee optimum positioning of the first shell relative to the first shell support.

According to another preferred feature, said predetermined position of the second shell relative to the second shell support is defined by a set of concentric jaws adapted to clamp the circumference of the second shell. Moreover, opening and closing of said jaws may be controlled by a cam ring.

The concentric jaws enable the use of shells of diverse sizes and guarantee positioning of the second shell with its center taken as a reference point.

BRIEF DESCRIPTION OF THE DRAWINGS

The description of the invention continues next with the description of a preferred embodiment given hereinafter by way of illustrative and nonlimiting example and with reference to the appended drawings. In the drawings.

DETAILED DESCRIPTION OF PREFERRED EMBODIMENTS

Figure 1:
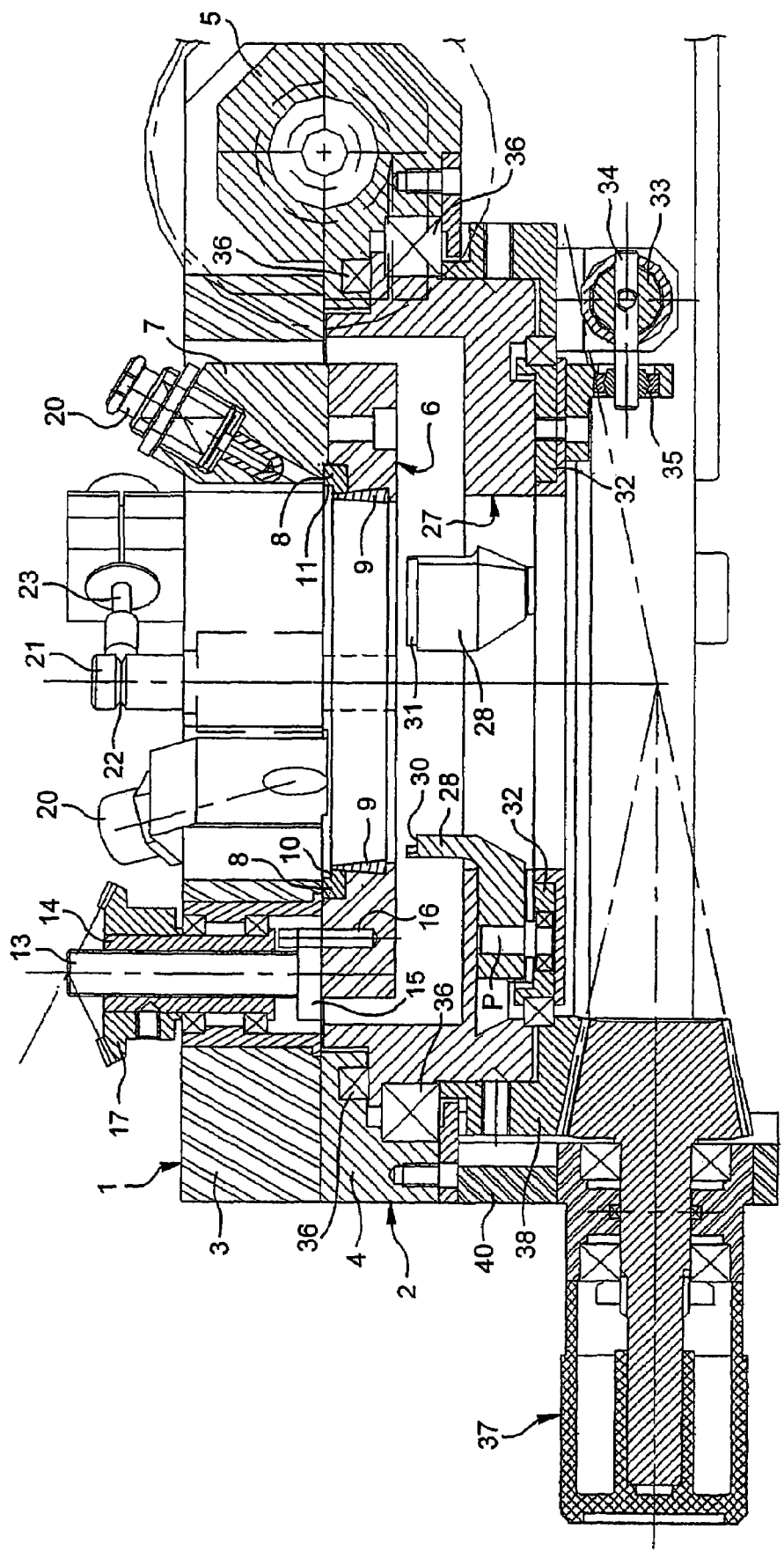
FIG. 1 is a part-sectional elevation view of a machine including shell supports of a device of the invention and supports for driving diverse predetermined movements of these shell supports, which machine is shown in a rest configuration in which it is ready to receive a first shell.

FIGS. 1 to 6 show a molding device of the invention including two supports formed here by a first plate 1 and a second plate 2 articulated to each other.

Each plate 1 and 2 includes a respective body 3 and 4 in which a central opening is formed. The two plates 1, 2 are articulated by means of hinges 5 to enable the assembly formed by the two plates 1, 2 to fold up on itself in a first configuration (see FIG. 1), in which the first plate 1 is on top of the second plate 2, to open up like a book (see FIGS. 3 and 4 which respectively show the first plate 1 disposed to the right of the hinge 5 and the second plate disposed to the left of the hinge 5) or to fold on itself in a second position (see FIG. 5), in which the second plate 2 is on top of the first plate 1.

Figure 2:
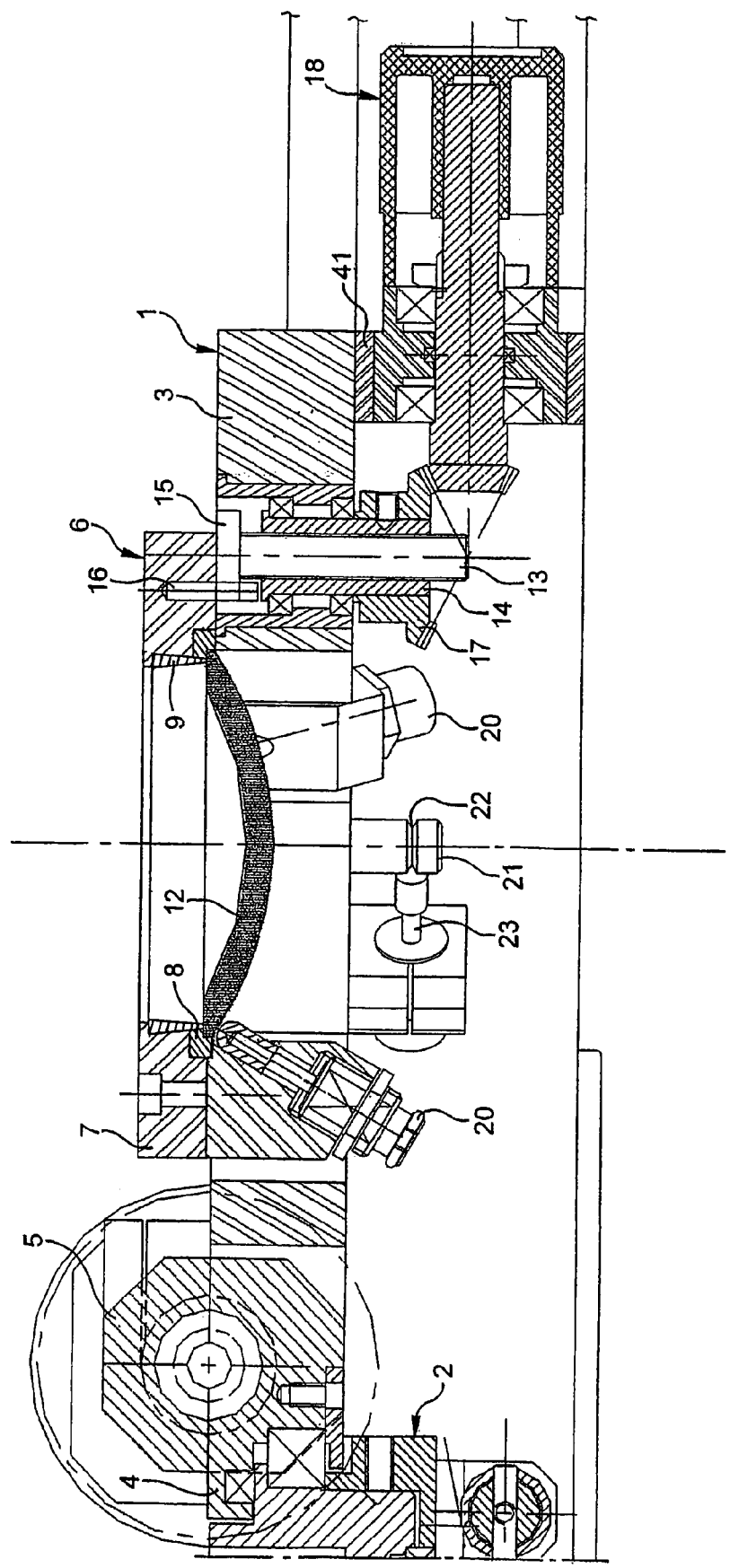
FIG. 2 is a view similar to FIG. 1, but the portion of the machine shown is that to the right (and not to the left) of the articulation axis along a transverse axis of the supports, the first shell being shown in place in a first shell support, the support on which the latter is mounted having pivoted one half-turn about the above transverse axis relative to its position shown in FIG. 1.

On the first plate 1, shown in FIG. 2, the device further includes a first shell support 6 that includes a body 7 having a central opening that is positioned facing the central opening of the first plate 1.

The first shell support 6 further includes an annular seat 8 force-fitted into the body 3 and surrounding said central opening and an annular seal 9 attached to the body 7 so that, in the absence of any applied force, it is positioned against an internal surface of the seat 8.

It will be noted that the seat 8 includes a circular machined portion defining two surfaces 10, 11 (see FIG. 1) for positioning a first shell 12, the annular seal 9 being flush with one of said positioning surfaces 10, namely the surface that is horizontal when the first plate 1 is in the position shown in FIG. 1 (in the remainder of the present description, the terms "horizontal" and "vertical" refer to the orientations shown in FIGS. 1 to 6).

The first shell support 6 is disposed in the central opening of the first plate 1 and is mounted on a set of slides 42 (see FIGS. 7 and 8) allowing vertical movement in translation of the first shell support 6 relative to the first plate 1.

This movement in translation is driven by a system comprising a screw 13 and a nut 14. This screw 13 has a head 15 bearing on a surface of the first shell support 6 so as to be able to raise the latter, the head 15 being prevented from rotating by a lug 16.

It will be noted that the lug 16 merely prevents rotation and does not impede movement of the shell support 6 in the vertical direction away from the head 15 and consequently from the first plate 1.

The nut 14 is mounted on the first plate 1 in rolling bearings so as to be able to turn freely to cause the screw 13 to ascend or descend.

This nut 14 is driven in rotation by a gear system 17 with concurrent axes enabling the nut 14 to be rotated manually by a knob 18.

A very accurate vertical position of the first shell support 6 relative to the first plate 1 is obtained in this way.

Figure 7:
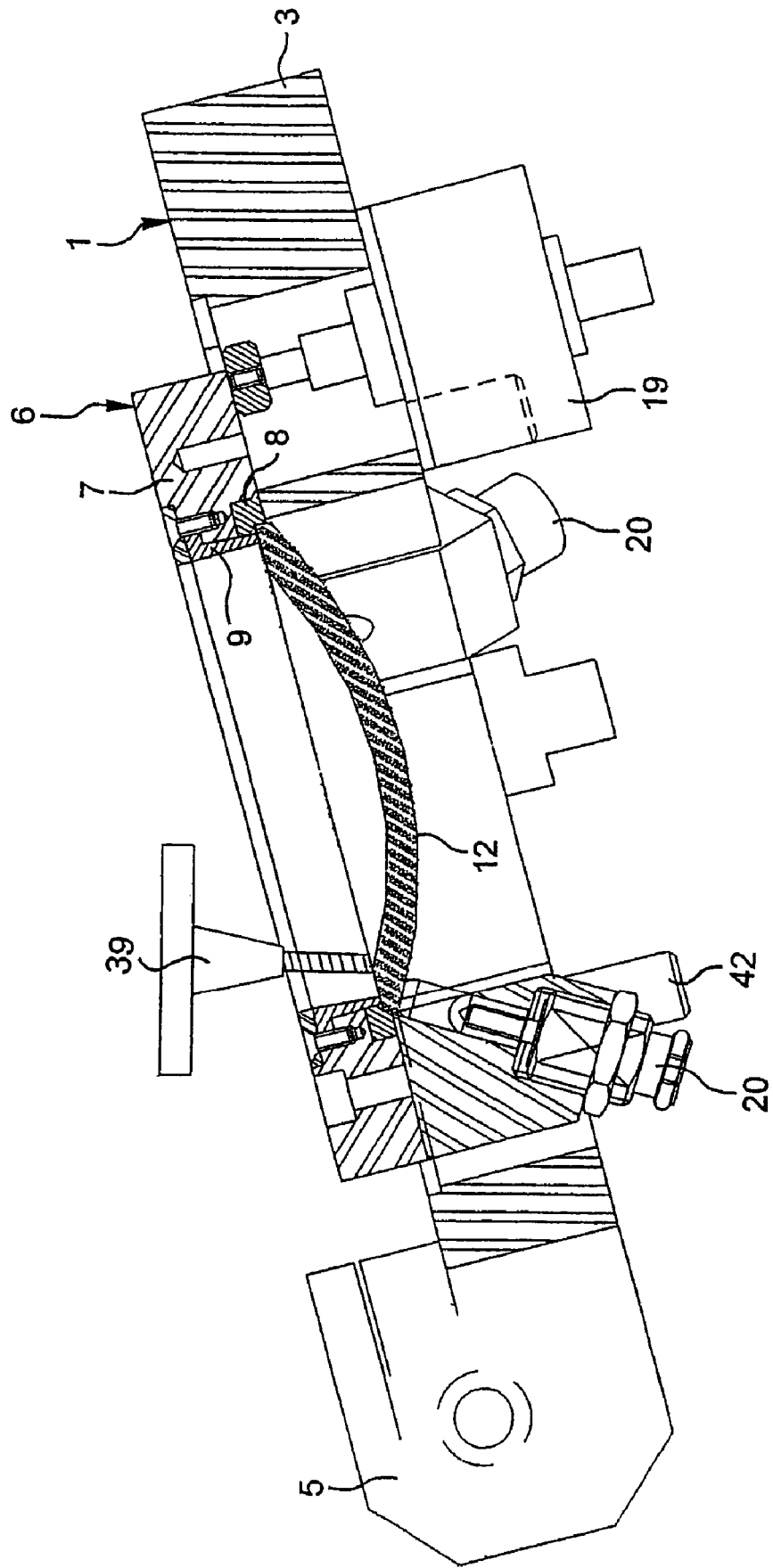
FIG. 7 is a view similar to FIG. 2, for a different embodiment of the machine and for a different method of filling the cup formed by the first shell and the annular seal.

Alternatively, the movement in translation of the first shell support 6 may be driven by a servomotor or a servocontrolled cylinder 19 (see FIG. 7).

Figure 5:
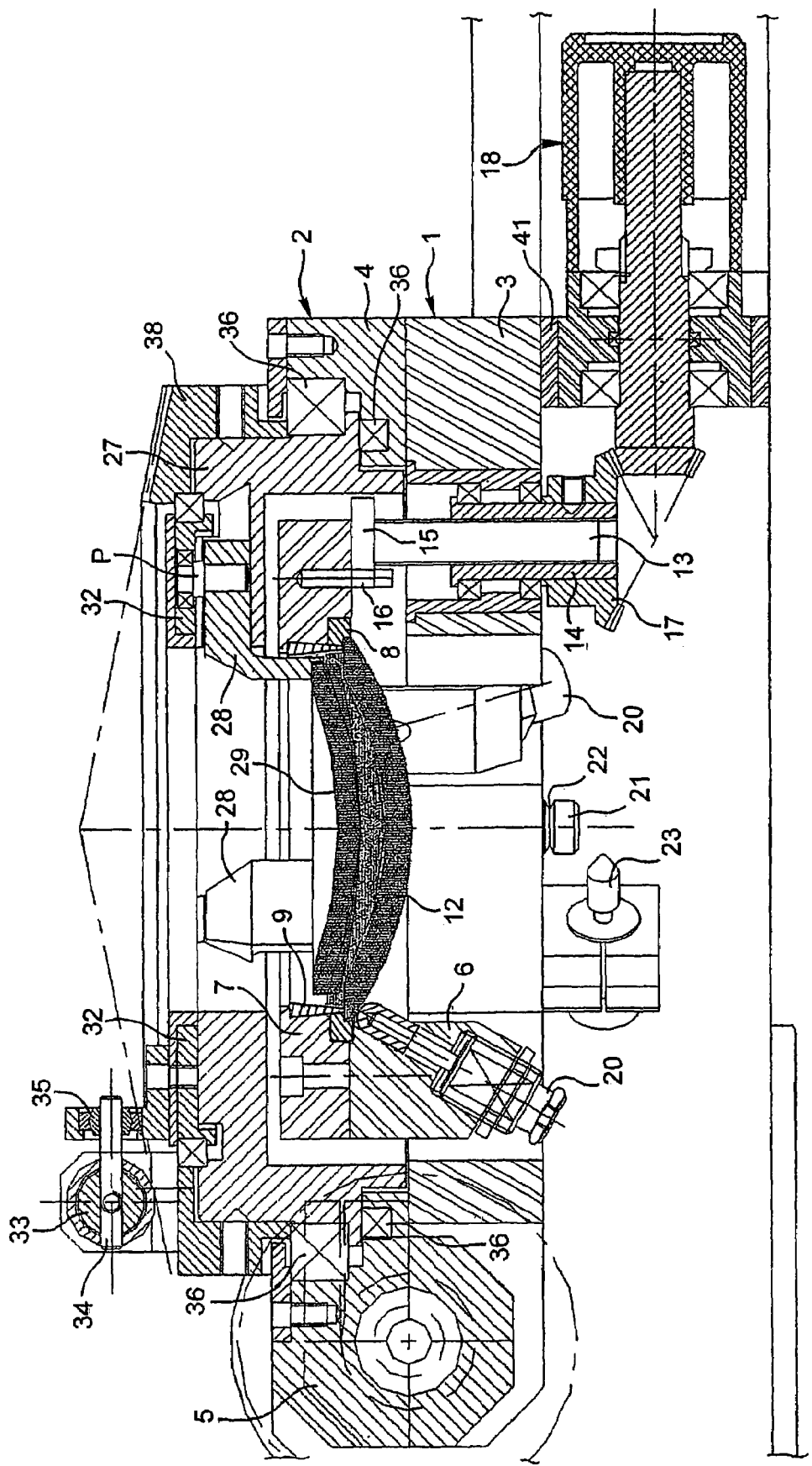
FIG. 5 is a view similar to FIG. 3 in a configuration of the machine in which the second shell support has pivoted one half-turn relative to its position shown in FIG. 4 and the relative position of the first shell support and the second shell support has been adjusted so that the respective facing surfaces of the first shell and the second shell have the required relative position.

The first shell support 6 can therefore assume a position in which it bears against the first plate 1 (FIG. 2) and a plurality of positions in which the first shell support is at a distance from the first plate 1 controlled by the knob 18 or the cylinder 19 (FIG. 5).

As described above, the annular seat 8 is intended to receive and position the first shell 12. To this end the first shell support 6 includes three clamping cylinders 20 (only two of these cylinders are visible in the figures, in section) regularly disposed at 120° around the seat 8 and disposed obliquely so that their piston rods are able to urge the first shell 12 against the seat 8 (FIGS. 2, 3, 4 and 5) after deformation of the seal 9.

When the first plate 1 is in the FIG. 2 position, the first shell support 6 rests under its own weight on the head 15 of the screw 13.

Conversely, when the first plate 1 is in the FIG. 1 position (i.e. turned over relative to the FIG. 2 position), its own weight tends to move the first shell support 6 away from the first plate 1. To prevent this, and to guarantee that the first shell support 6 and the first plate 1 remain pressed together even during pivoting of the first plate 1 about the axis of the hinge 5, the molding device includes stop means consisting here of a rod (slide) 21 projecting from the first shell support 6 and having at its end a groove 22, together with a cylinder 23 having a conical end-piece adapted to immobilize the rod 21 by means of its groove 22 (FIG. 1).

This locking position of the stop means corresponds to a stable position in which the first shell support 6 is pressed against the first plate 1.

Figure 8:
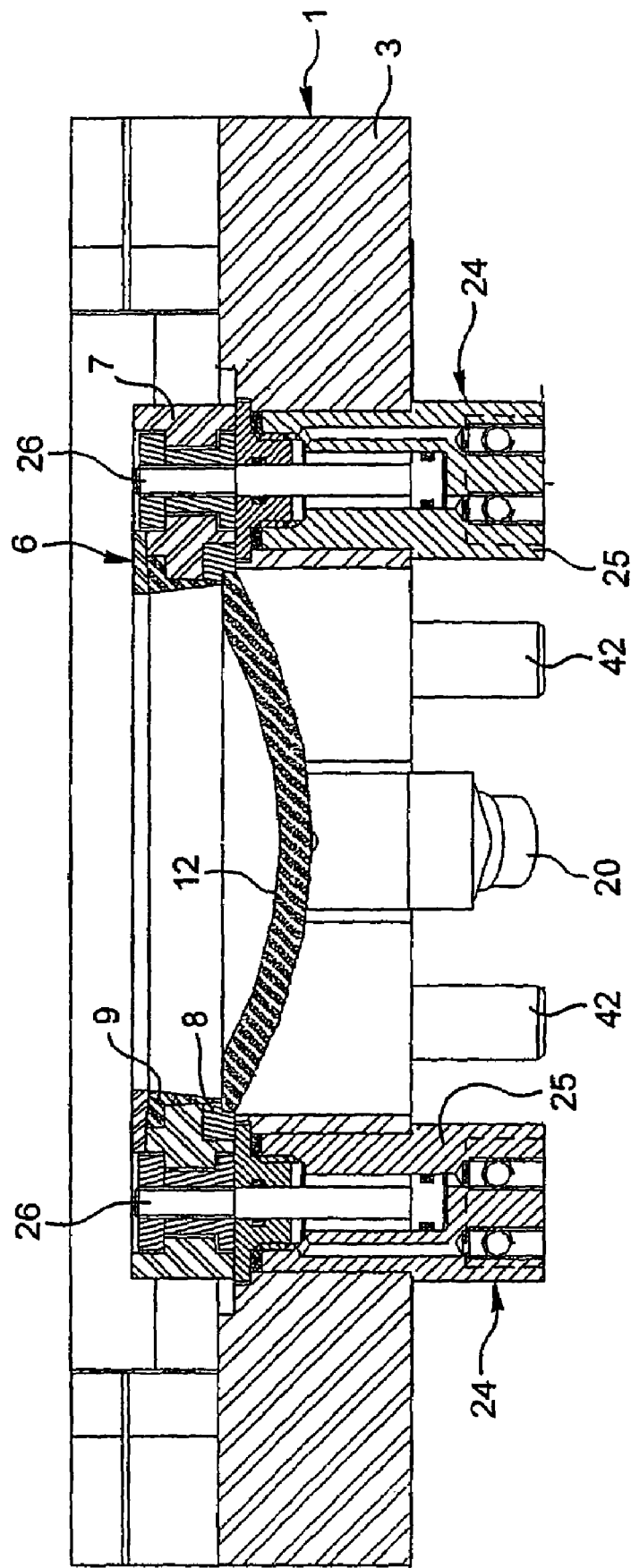
FIG. 8 is another view of this embodiment of the machine in section in a plane transverse to the section plane of FIG. 7.

In a variant shown in FIG. 8, these stop means consist of two double-acting cylinders 24; the body 25 of each cylinder 24 is fastened to the first plate 1 and the rod 26 of each cylinder 24 is fastened to the first shell support 6. These cylinders may be pressurized in the conventional way to position the first shell support 6 against the first plate 1, in this instance by establishing communication of the smaller section chamber of these cylinders with the pressure source and of the larger section chamber with a return line at atmospheric pressure.

These cylinders may equally be pressurized in the larger section chamber to exercise a compensation cylinder function described hereinafter.

In so far as the second plate 2 (visible more particularly in FIG. 4) is concerned, the latter also includes a body 4 in which is formed a central opening occupied by a second shell support 27, the second shell support 27 itself including a central opening facing the central opening of the body 4, so that the second shell support 27 is open throughout its thickness.

The second shell support 27 includes a set of three concentric clamping jaws 28 for clamping and positioning a second shell 29, positioning being effected, as for the first shell support 6, by machining the jaws 28 to define on each of them two orthogonal surfaces 30, 31 (see FIG. 1). It will be noted that when the plates 1 and 2 are facing each other (to the right or to the left of the hinge 5), the surfaces 10 and 30 are parallel and the surfaces 11 and 31 are concentric.

Here the concentric clamping of these jaws 28 is obtained in a manner that is known in the art by a cam ring 32 adapted, when it rotates about the central opening, to displace radially three pins P each attached to one of the jaws 28.

The cam ring 32 is rotated by a cylinder 33 adapted to move a rod 34 attached to the cam ring 32 by a ball-joint 35 perpendicularly to the plane of the drawing.

The second shell support 27 is mounted on rolling bearings 36 so that it can turn relative to the body 4 about the vertical axis about which the jaws 28 are concentric.

The second shell support 27 may be rotated relative to the second plate 2 by a knob 37 attached to the body 4 and which meshes with a conical gear 38 attached to the second shell support 27.

The angular position of the second shell 29 about the vertical axis passing through its center (the center of concentricity of the jaws 28) can therefore be accurately adjusted using the knob 37 (which may be replaced by a servomotor to automate this task).

The molding device as a whole is retained within a production machine by the hinge-pin of the hinge 5. Abutments 40, 41 define horizontal rest positions of the first plate 1 to the right of the hinge 5 and of the second plate 2 to the left of the hinge 5.

The pivoting of the plates 1, 2 about the hinge 5, which is held fixed, is motorized, for example by respective gears turning about the axis of the hinge 5, each of the plates 1, 2 being rotationally coupled to one of said gears.

Moreover, control means are provided for controlling the various members of the molding device that may be actuated automatically.

For example, a programmable automaton or a microprocessor executing an appropriate program actuates in a precise order the pivoting of the two plates 1, 2, the movement of the concentric jaws 28, the movement in translation of the first shell support 6 relative to the first plate 1 (in the situation in which a cylinder 19 is provided, as in FIG. 7), and the driving of the clamping cylinders 20 and, where applicable, of the double-acting cylinders 24.

The control means are also adapted to control any supplementary holding, polymerizable material deposition or polymerization devices, as described hereinafter.

The molding device that has just been described operates in the manner indicated hereinafter.

The initial configuration of the device is that of FIG. 1, with the two plates 1, 2 superposed to the right of the hinge 5.

The first shell 12 is then loaded onto the first plate 1 from above with the stop means 21, 22, 23 (or the locking/compensation cylinders 24) in the position in which they hold the first shell support 6 against the first plate 1. This first shell 12 is moved by any form of holding means, for example a sucker, with its concave side facing downward, i.e. toward the second plate 2, and positioned in the annular seat 8, with the clamping cylinders 20 retracted.

Thus the first shell 12 rests under its own weight on the positioning surface 10 and is positioned laterally by the positioning surface 11.

The clamping cylinders 20 are then deployed and kept pressurized so that their rods immobilize the edges of the first shell 12 against the annular seat 8, thereby deforming the seal 9.

The first shell 12 having been positioned, the first plate 1 is pivoted to place it to the right of the hinge 5 (see FIG. 2).

It will be noted that in this position the annular seal 9 is compressed against the first shell 12 so that the junction between the seal 9 and the first shell 12 is sealed and the concave face of the first shell 12, which here must be used for molding, cooperates with the seat 8 and the seal 9 to form a cup whose bottom faces upward (FIG. 2).

A quantity of polymerizable material predetermined as a function of the volume to be molded is then deposited in the cup formed in this way, either manually or by an appropriate deposition device such as a metering valve.

Figure 3:
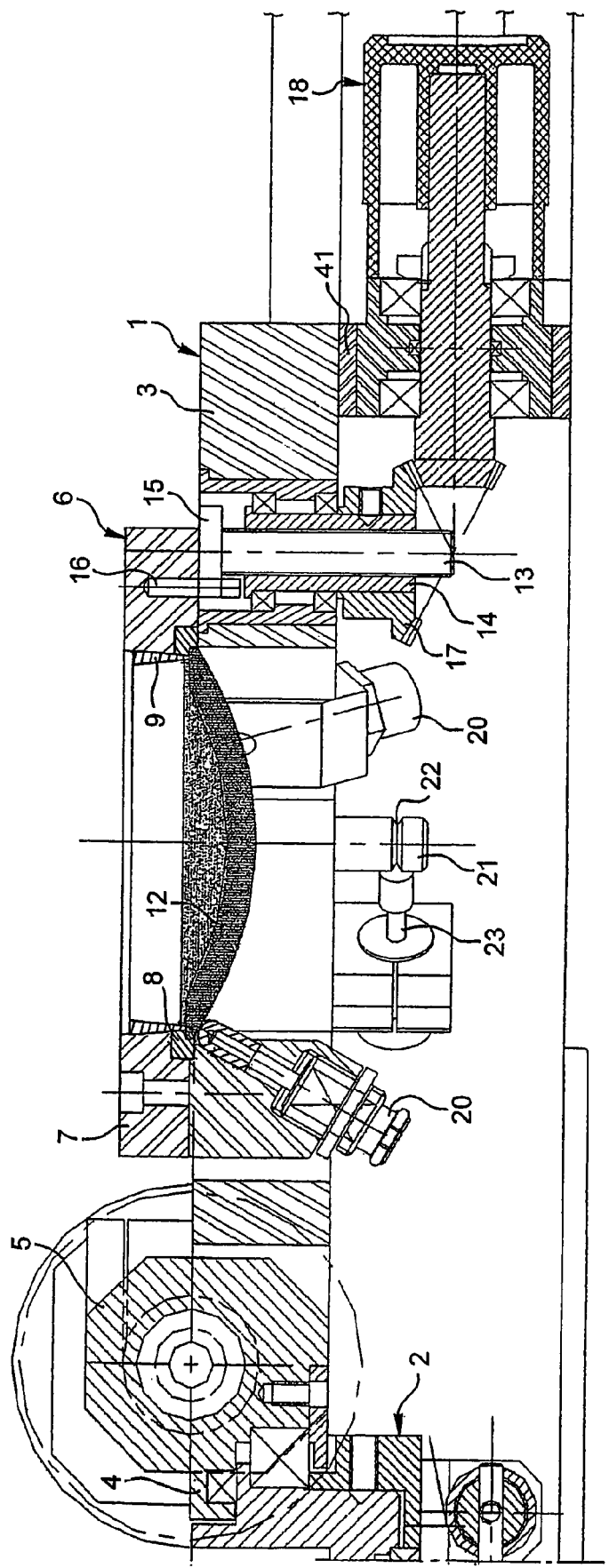
FIG. 3 is a view similar to FIG. 2, but in which the cup formed by the first shell and the annular seal has been filled with polymerizable material.

FIG. 3 shows the first plate 1 after the deposition of the material.

Figure 4:
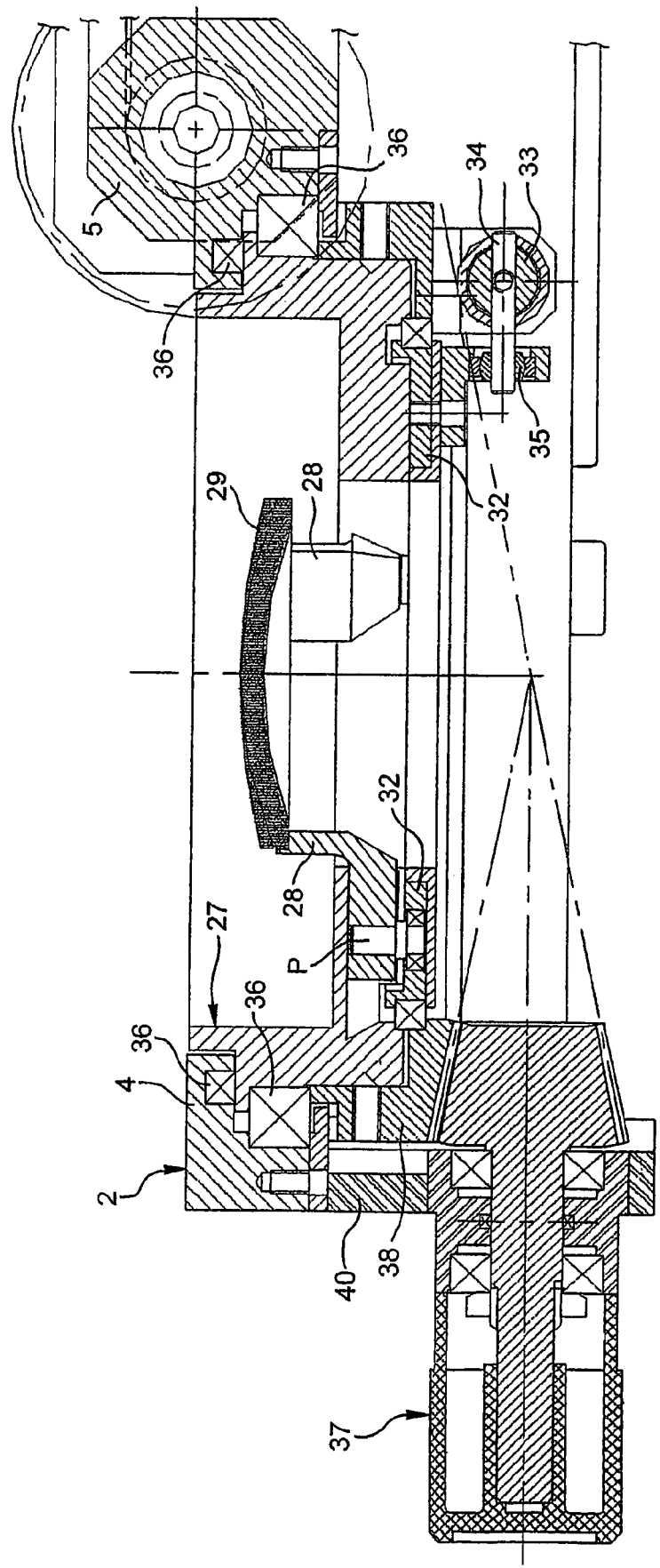
FIG. 4 is a view similar to FIG. 1, contemporaneous with FIG. 3, but for the portion of the machine to the left of the transverse articulation axis, with a second shell placed in the second shell support.

Because the respective right-hand and left-hand portions of the device shown in FIGS. 3 and 4 correspond to the same position, the operation shown in FIG. 4 may be effected simultaneously with the deposition of material just described. Carrying out this operation in "masked" time improves productivity. The second shell 29 is placed from above, where applicable by the same holding means as the first shell 12, and is positioned and clamped by the jaws 28, with its molding face, which here is its convex face, facing upward (FIG. 4).

If the second shell 29 is intended for molding a lens for correcting astigmatism, once the second shell 29 has been clamped, it may be necessary to adjust its angular position about a vertical axis using the knob 37.

The second plate 2 is then pivoted to superpose it on the first plate 1 to the right of the hinge 5.

The second shell 29 is then facing and at a distance from the cup formed by the first shell 12.

The stop means 21, 22, 23 (or the cylinders 24) being inhibited, the first shell support 6 is lifted off the first plate by the action of the knob 18 or the servocontrolled cylinder 19 so that the first shell 12 brings the polymerizable material into contact with the second shell 29, as shown in FIG. 5.

It will be noted that a reserve of material is provided by the surplus material at the periphery of the active concave surface of the first shell 12.

The first and second shells 12, 29 being in a predetermined position relative to the device, the raising of the first shell support 6 may be controlled so that the distance between the two shells 12, 29 corresponds precisely to the required mold dimensions.

A phase of polymerization of the material then follows. For this, projection means, for example ultraviolet ray projection means, are positioned above and below the assembly formed by the two shells 12, 29 and the material.

The shells 12, 29 are advantageously transparent and the central openings of the plates 1, 2 and of the shell supports 6, 27 provide a large aperture for the rays, to guarantee effective polymerization.

Moreover, the molding device is designed to accommodate shrinkage of the material during polymerization. Occupying less volume as it polymerizes, the material exerts an attraction force on the molding surfaces of the shells 12, 29.

The first shell support 6 simply resting on the head 15 of the screw 13 (or on the rod of the cylinder 19) by virtue of its own weight, this attraction force can be exploited to lift the first shell support 6 so that the first shell 12 and the second shell 29 remain pressed against the material during shrinkage, which prevents separation of the shells and the material.

Figure 10:
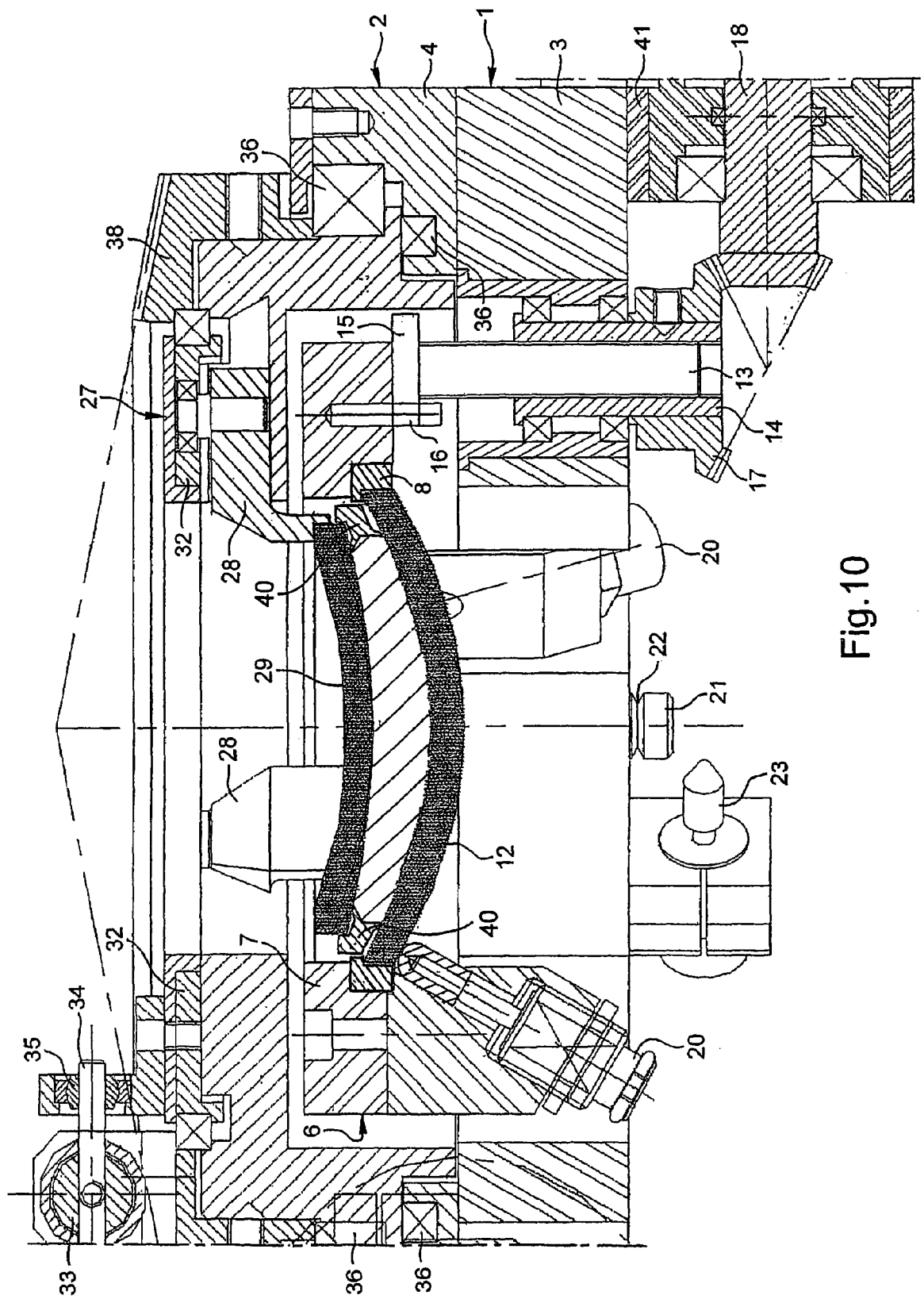
FIG. 10 is a view similar to FIG. 5 of the FIG. 9 variant to a larger scale.

The FIG. 10 cylinders 24 may additionally operate as compensation cylinders to facilitate the movement of the shells toward each other. The larger section chambers of these cylinders 24 are then pressurized so that the cylinders 24 exert on the first shell support 6 an upward vertical force the intensity whereof is slightly less than the weight of the first shell support 6 and the smaller section chambers are connected to a return line that is vented to atmospheric pressure.

After polymerization, the shells 12, 29 and the solidified material form a rigid block.

The concentric jaws 28 are then loosened, the second plate 2 is pivoted toward its initial position and the first shell support 6 is returned to and locked against the first plate 1.

Figure 6:
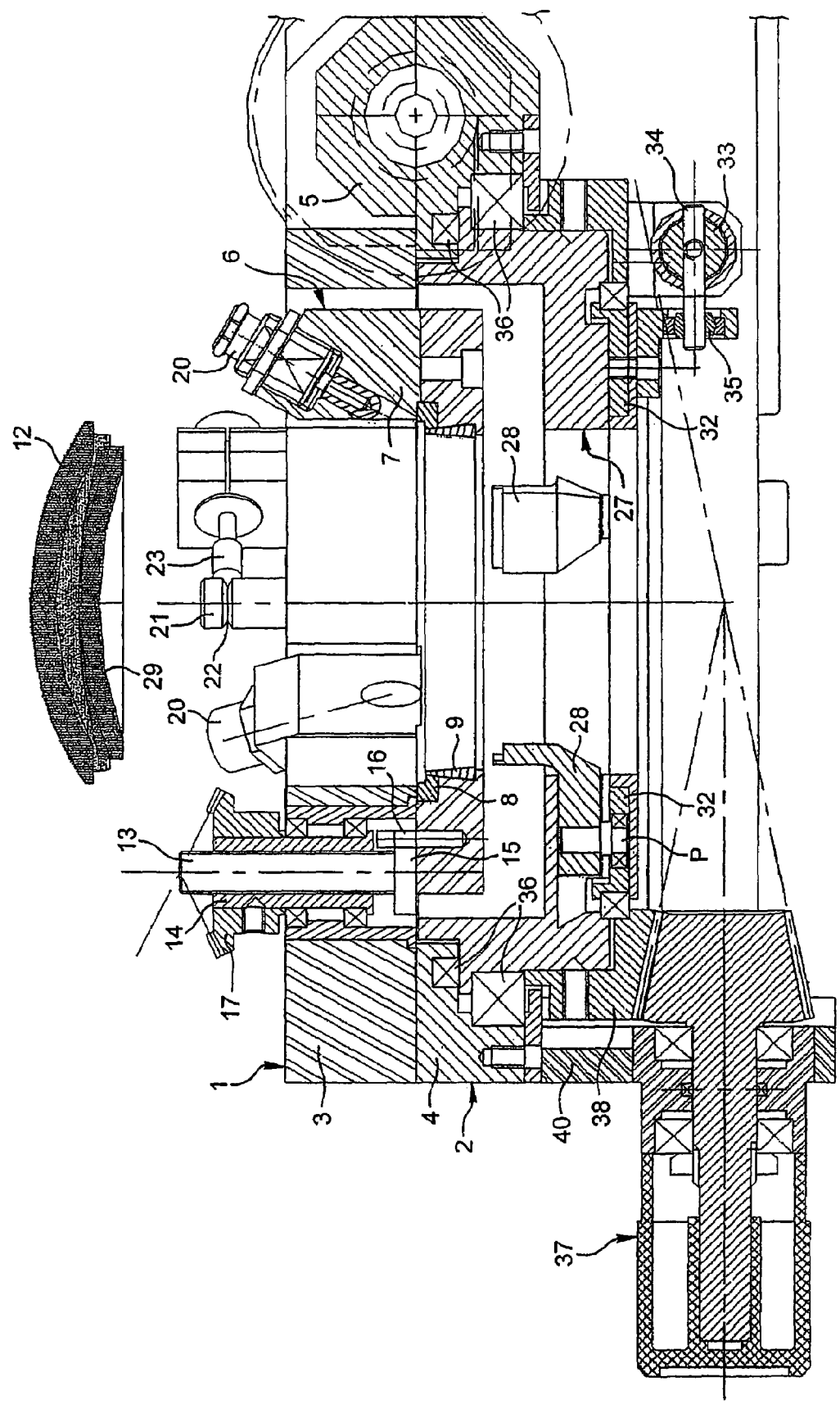
FIG. 6 is a view similar to FIG. 1, again showing the machine in the rest configuration and showing, during its evacuation from the machine, the combination formed by the first shell, the second shell and the pre-polymerized material in the process of being evacuated from the machine.

The first plate 1 is then also pivoted toward its initial position, as shown in FIG. 6, and after retraction of the clamping cylinders 20, the block formed of the shells 12, 29 and the solidified material is then removed in the upward direction, where applicable by the same holding means as position the shells 12, 29.

In the variant including the servocontrolled cylinder 19 and the cylinders 24, after loosening the jaws 28, the operation of moving the shell support 6 onto and locking it to the first plate 1 and the operation of pivoting this first plate 1 toward its initial position can be effected in parallel.

The ophthalmic lens molded and polymerized in the above manner can then undergo consecutive other processing steps in which it is removed from the mold and prepared for mounting on a support such as a spectacle frame.

FIG. 7 shows a variant of the step of depositing polymerizable material in the cup formed by the first shell 12 and the first shell support 6. It shows diagrammatically a material deposition nozzle 39. The first plate 1 is inclined, unlike the plate used in the step described above.

The nozzle 39 first deposits a bead of material onto an edge of the first shell 12; as the cup is filled, the first plate 1 returns to its horizontal position, until the FIG. 3 situation is obtained.

This variant minimizes defects caused by impact of the material against the first shell 12 during expulsion.

Moreover, the first plate 1 may equally well remain inclined for subsequent steps, instead of returning to the FIG. 3 horizontal position as filling proceeds. The second plate 2 will then be superposed on the first plate 1 so as to be inclined itself, which enables the second shell 29 to come into contact with the material from an edge rather than the center during the step of movement toward each other of the first shell 12 and the second shell 29.

Figure 9:
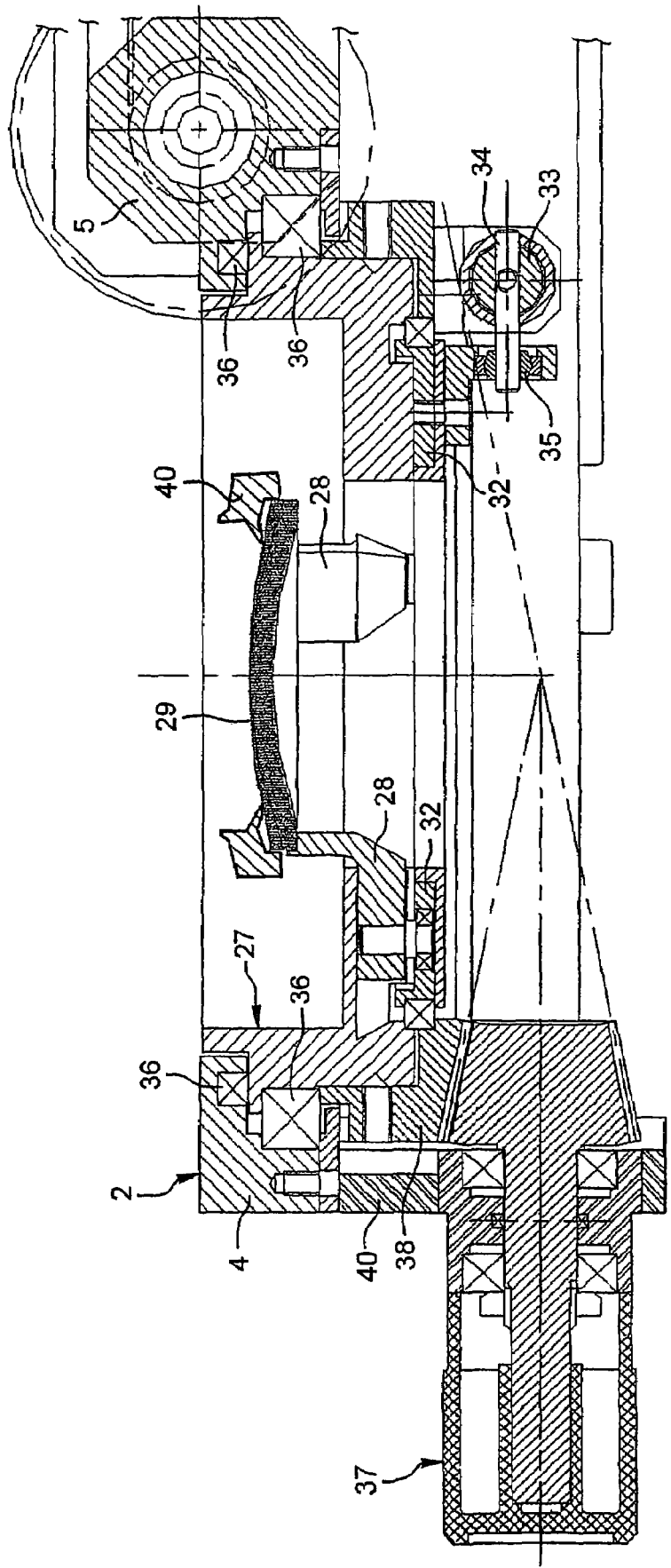
FIG. 9 is a view similar to FIG. 4 and showing a variant of the second shell fitted with an annular seal.

FIGS. 9 and 10 show a variant in which molding is effected with an annular seal 40 fixed to the second shell 29 before or just after it is clamped by the concentric jaws 28 (see FIG. 9).

After the second plate 2 pivots to the right of the hinge 5 and the two shells 12, 29 move toward each other (FIG. 10), the material remains trapped between the two shells 12, 29 and the seal 40, ready to be polymerized.

In FIG. 10, and likewise in FIGS. 1, 5 and 6, note that the two plates 1, 2 are superposed by placing one against the other two reference surfaces belonging to the first plate 1 and to the second plate 2, respectively.

In an embodiment that is not shown, molding may be effected other than flat, for example vertically. The two plates then have a vertical orientation in their molding relative position, an annular seal of the type shown in FIGS. 9 and 10 being provided between the two shells. During molding, the material is injected via an orifice formed in the seal; a vent is provided in the upper portion of the seal.

In another embodiment that is not shown, the supports consist of members other than plates.

Similarly, molding other types of optical lenses may be envisaged, for example binocular lenses or the like.

Thus variants of the device may be envisaged that do not depart from the scope of the invention.

The invention claimed is:

1. A device for producing an optical lens from a polymerizable material, the device comprising:

a first molding shell (12);

a second molding shell (29); and means for holding said first molding shell (12) and said second molding shell (29) in a predetermined molding position to face each other at a distance in a predetermined relative position and with a predetermined orientation, wherein the means for holding comprises i) a first shell support (6) configured to immobilize said first shell (12) in a predetermined position relative to said first shell support (6) and a second shell support (27) configured to immobilize said second shell (29) in a predetermined position relative to said second shell support (27), a first support (1) on which said first shell support (6) is mounted, and ii) a second support (2) on which the second shell support (27) is mounted, the first support (1) and the second support (2) being articulated to each other about a fixed hinge (5) with respect to which the first support (1) and the second support (2) are each configured to pivot, wherein the first support (1) and the second support (2) are configured to assume i) a first relative position in which the first support (1) and the second support (2) are one against the other with the first shell (12) and the second shell (29) in said predetermined relative position and ii) a second relative position in which, compared to said first relative position, the first support (1) and the second support (2) are moved away from each other by virtue of a relative pivoting movement, said device having a molding configuration in which the first support (1) and the second support (2) are in said first relative position and the first shell (12) and the second shell (29) have said predetermined orientation, and wherein the device further comprises a first configuration in which the first support (1) and the second support (2) are in said first relative position and each is oriented flat with the first support (1) above the second support (2), and a second configuration in which the first support (1) and the second support (2) are in said first relative position and each is oriented flat with the second support (2) above the first support (1).

2. The device according to claim 1, wherein said predetermined orientation is a flat orientation.

3. The device according to claim 1, wherein the first support (1) and the second support (2) are opposite each other in said second relative position.

4. The device according to claim 1, wherein the first support (1) and the second support (2), in an open configuration, are in said second relative position and each is flat.

5. The device according to claim 4, wherein the respective faces of the first support (1) and the second support (2) that face each other in said first relative position each face upward in said open configuration.

6. The device according to claim 1, wherein the first support (1) and the second support (2) each have a reference surface, said reference surfaces being disposed against each other when the first support (1) and the second support (2) are against each other in said first relative position.

7. The device according to claim 1, wherein the first support (1) and the second support (2) are connected by a hinge (5).

8. The device according to claim 1, further comprising:

two wheels perpendicular to the articulation axis of the two supports (1, 2) and each situated on either side of that articulation axis so that the axis of each of the wheels coincides with said articulation axis of the two supports (1, 2), a first of these wheels being rotationally connected to the first support (1) and a second of these wheels being rotationally connected to the second support (2) so that rotation of the first wheel drives pivoting of the first support (1) relative to the second support (2) and rotation of the second wheel drives pivoting of the second support (2) relative to the first support (1).

9. The device according to claim 8, wherein said wheels are toothed wheels each adapted to be driven by a gear connected to a motor or a rack connected to a cylinder.

10. The device according to claim 1, wherein the first shell support (6) cooperates slidingly with the first support (1) to enable mutual closing or opening movement of the first shell (12) and the second shell (29) when the first shell (12) and the second shell (29) are in said molding position.

11. The device according to claim 10, wherein sliding of the first shell support (6) relative to the first support (1) is driven by a servocontrolled cylinder (19) which also immobilizes the first shell support (6) relative to the first support (1) except for closing movement of the first shell support (6) and the second shell support (27).

12. The device according to claim 1, wherein the second shell support (27) is rotatable relative to the second support (2).

13. according to claim 1, wherein said predetermined position of the first shell (12) relative to the first shell support (6) is defined by an annular seat (8) adapted to position the first shell (12) in two orthogonal directions.

14. The device according to claim 13, wherein the first shell support (6) includes at least one cylinder (24) adapted to hold the first shell (12) against said annular seat (8).

15. The device according to claim 1, wherein said predetermined position of the second shell (29) relative to the second shell support (27) is defined by a set of concentric jaws (28) adapted to clamp the circumference of the second shell (29).

16. The device according to claim 15, wherein opening and closing of said jaws (28) are controlled by a cam ring (32).

17. A method of obtaining an optical lens from a polymerizable material, using the device according to claim 1, the method comprising:

polymerizing the polymerizable material between the first shell (12) and the second shell (29) with the device in said second configuration so that a rigid block is formed by said shells (12, 29) and the solidified material;

moving from said second configuration to said first configuration of the device; then evacuating said rigid block with the device in said first configuration.

* * * * *

UNITED STATES PATENT AND TRADEMARK OFFICE
CERTIFICATE OF CORRECTION

PATENT NO. : 7,607,910 B2
APPLICATION NO. : 10/558399
DATED : October 27, 2009
INVENTOR(S) : Freson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Twelfth Day of October, 2010

David J. Kappos
*Director of the United States Patent and Trademark Office*